United States Patent
Tseng et al.

(10) Patent No.: US 10,361,616 B2
(45) Date of Patent: Jul. 23, 2019

(54) VOICE COIL MOTOR

(71) Applicant: LARGAN PRECISION CO., LTD., Taichung (TW)

(72) Inventors: Te-Sheng Tseng, Taichung (TW); Wen-Hung Hsu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/053,914

(22) Filed: Aug. 3, 2018

(65) Prior Publication Data
US 2018/0342939 A1 Nov. 29, 2018

Related U.S. Application Data

(63) Continuation of application No. 14/997,607, filed on Jan. 18, 2016, now Pat. No. 10,075,052.

(30) Foreign Application Priority Data

Dec. 1, 2015 (TW) .............................. 104219296 U

(51) Int. Cl.
*H02K 41/035* (2006.01)
(52) U.S. Cl.
CPC ................... *H02K 41/0356* (2013.01)
(58) Field of Classification Search
CPC .................................................. H02K 41/0356
See application file for complete search history.

(56) References Cited

U.S. PATENT DOCUMENTS

| 7,627,238 | B2 | 12/2009 | Osaka et al. |
| 7,663,823 | B2 | 2/2010 | Chung |
| 7,706,088 | B2 | 4/2010 | Chung |
| 7,876,515 | B2 | 1/2011 | Liao |
| 8,049,160 | B2 | 11/2011 | Zhang |
| 8,319,886 | B1 * | 11/2012 | Wang ....................... G02B 7/08 348/202 |
| 8,537,226 | B2 | 9/2013 | Ke |
| 8,582,222 | B2 | 11/2013 | Huang et al. |
| 8,736,988 | B2 * | 5/2014 | Cheng .................. G02B 6/4457 359/694 |
| 8,743,743 | B1 | 6/2014 | Mai et al. |
| 9,140,884 | B2 * | 9/2015 | Lee .................... H02K 41/0356 |
| 9,778,436 | B2 * | 10/2017 | Lu ............................ G02B 7/09 |

(Continued)

*Primary Examiner* — Alexander Talpalatski
(74) *Attorney, Agent, or Firm* — McClure, Qualey & Rodack, LLP

(57) ABSTRACT

A voice coil motor includes a holder, a metal yoke, a carrier, a plurality of magnets, a coil and at least two spring plates. The holder includes a first opening and a cylindrical sidewall disposed around the first opening. The metal yoke coupled to the holder includes a second opening and a front end portion. The cylindrical sidewall extends from the first opening towards the second opening. The carrier movably disposed in the metal yoke includes a covering portion disposed on one side of the carrier towards the holder and correspondingly to the cylindrical sidewall, wherein the covering portion surrounds the cylindrical sidewall and farther from the first opening than the cylindrical sidewall. The magnets are disposed in the metal yoke. The coil is wound around the carrier and adjacent to the magnets. Each of the spring plates is flat sheet and coupled to the carrier.

12 Claims, 7 Drawing Sheets

(56) References Cited

U.S. PATENT DOCUMENTS

| | | | |
|---|---|---|---|
| 2011/0291495 A1* | 12/2011 | Lee .................... | G02B 17/08 |
| | | | 310/12.16 |
| 2014/0049847 A1* | 2/2014 | Hsu .................... | G02B 7/08 |
| | | | 359/823 |
| 2014/0340775 A1* | 11/2014 | Hsu .................... | H04M 1/0264 |
| | | | 359/824 |
| 2015/0055234 A1* | 2/2015 | Nakagawa .......... | G02B 7/08 |
| | | | 359/824 |

* cited by examiner

VOICE COIL MOTOR

RELATED APPLICATIONS

The present application is a continuation of the application Ser. No. 14/997,607, filed Jan. 18, 2016, now U.S. Pat. No. 10,075,052, which claims priority to Taiwan Application Serial Number 104219296, filed Dec. 1, 2015, which is herein incorporated by reference.

BACKGROUND

Technical Field

The present disclosure relates to a voice coil motor. More particularly, the present disclosure relates to a voice coil motor which is applicable to optical lenses in electronic devices.

Description of Related Art

In general, the voice coil motor (VCM) is applied to the optical lens in the electronic device for providing an auto-focusing function, and the spring plates of the voice coil motor are generally assembled on the carrier. When the optical lens is carried to move by the carrier, the spring plates are deformed by force to provide moving freedom and restoring force for the carrier so as to achieve the auto-focusing function of the optical lens.

However, dust usually falls on the image surface through the opening of the metal yoke and the opening of the holder during the assembling process of the voice coil motor and the optical lens. It results in reducing the assembling yield rate and the image quality, so that it becomes difficult to satisfy the requirements of high-end optical lenses in electronic devices.

Given the above, how to reduce dust falling on the image surface during the assembling process has become one of the important subjects, so that the assembling yield rate can be enhanced and the requirements of high-end optical lenses in electronic devices can be satisfied.

SUMMARY

According to one aspect of the present disclosure, a voice coil motor includes a holder, a metal yoke, a carrier, a plurality of magnets, a coil and at least two spring plates. The holder includes a first opening and a cylindrical sidewall disposed around the first opening. The metal yoke coupled to the holder includes a second opening and a front end portion. The cylindrical sidewall extends from the first opening towards the second opening. The second opening is disposed on the front end portion, wherein the front end portion includes a plurality of stepped surfaces. The carrier movably disposed in the metal yoke includes a covering portion disposed on one side of the carrier towards the holder and correspondingly to the cylindrical sidewall, wherein the covering portion surrounds the cylindrical sidewall and farther from the first opening than the cylindrical sidewall. The magnets are disposed in the metal yoke, wherein each of the stepped surfaces is disposed correspondingly to each of the magnets for adjusting a relative position parallel to a central axis between the magnets and the second opening. The coil is wound around the carrier and adjacent to the magnets. Each of the spring plates is flat sheet and coupled to the carrier. When a height of the cylindrical sidewall parallel to a central axis is h, the following condition is satisfied: 0.20 mm<h<0.85 mm.

DETAILED DESCRIPTION

Figure 1:
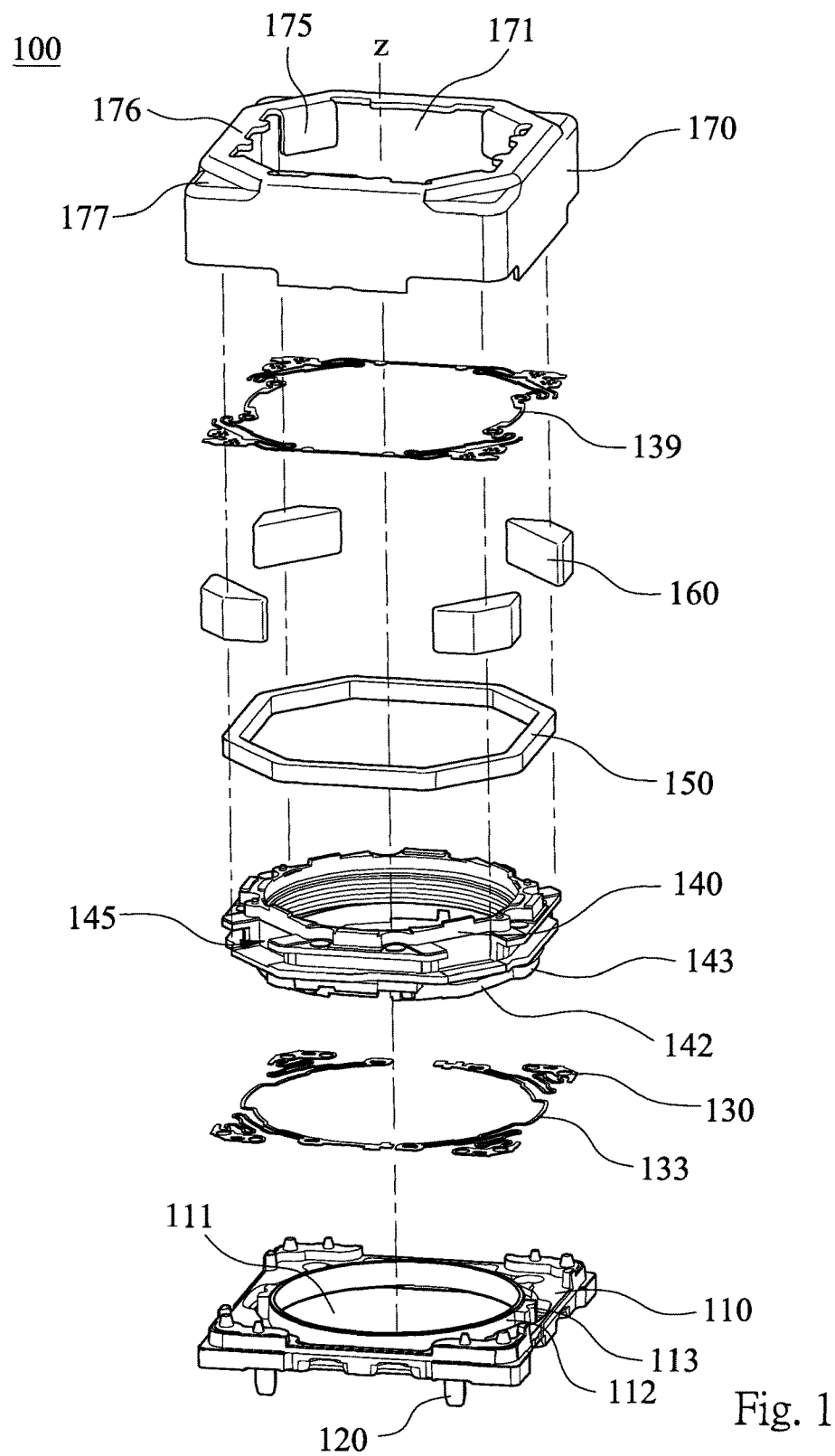
FIG. 1 is an exploded view of a voice coil motor according to one embodiment of the present disclosure.

FIG. 1 is an exploded view of a voice coil motor 100 according to one embodiment of the present disclosure. In FIG. 1, the voice coil motor 100 includes a holder 110, a metal yoke 170, a carrier 140, a plurality of magnets 160, a coil 150 and at least two spring plates. According to the embodiment of FIG. 1, the voice coil motor 100 includes two spring plates, which are a first spring plate 130 and a second spring plate 139 respectively, but not limited thereto.

Figure 2:
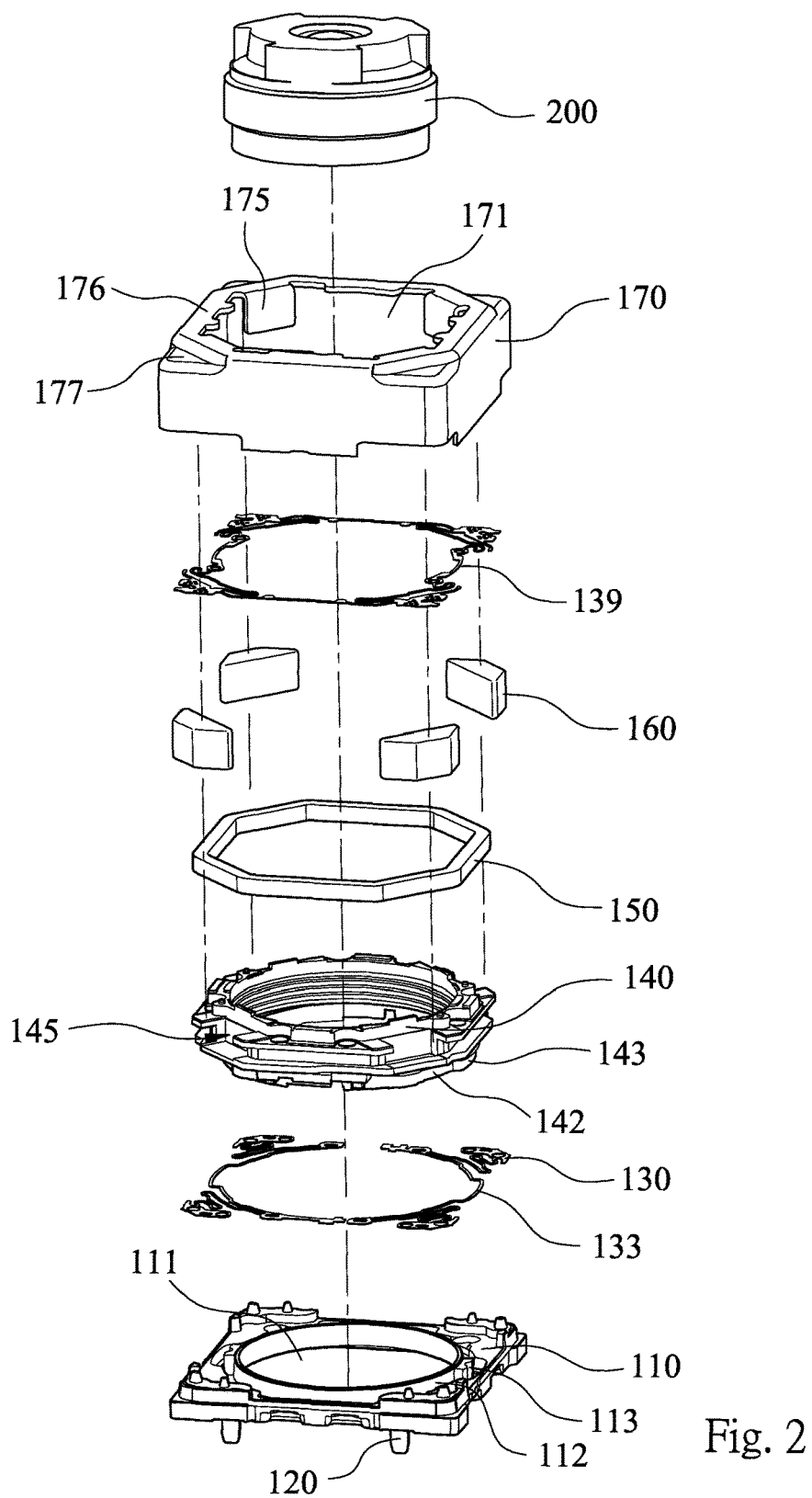
FIG. 2 is an exploded view of a lens assembly assembled to the voice coil motor of FIG. 1.
Figure 3:
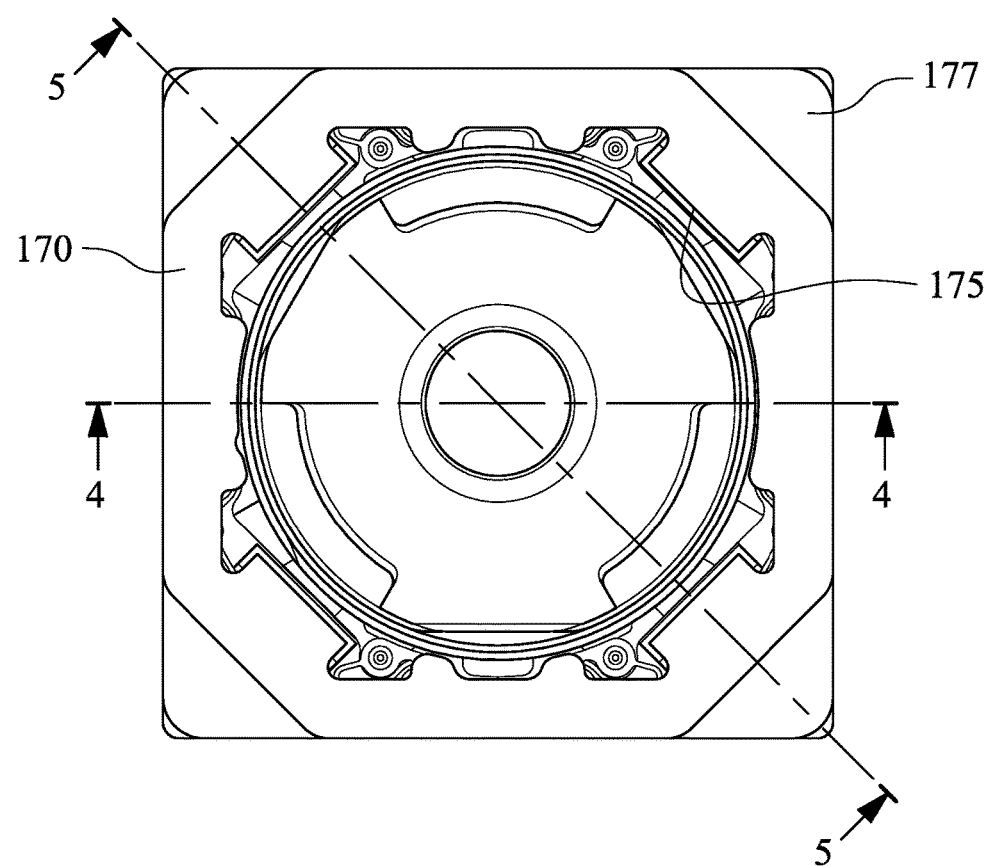
FIG. 3 is a top view of the voice coil motor and the lens assembly of FIG. 2.

FIG. 2 is an exploded view of a lens assembly 200 assembled to the voice coil motor 100 of FIG. 1, and FIG. 3 is a top view of the voice coil motor 100 and the lens assembly 200 of FIG. 2. In FIG. 2 and FIG. 3, the voice coil motor 100 can be applied to the lens assembly 200 so as to provide an auto-focusing mechanism for the lens assembly 200.

Figure 4:
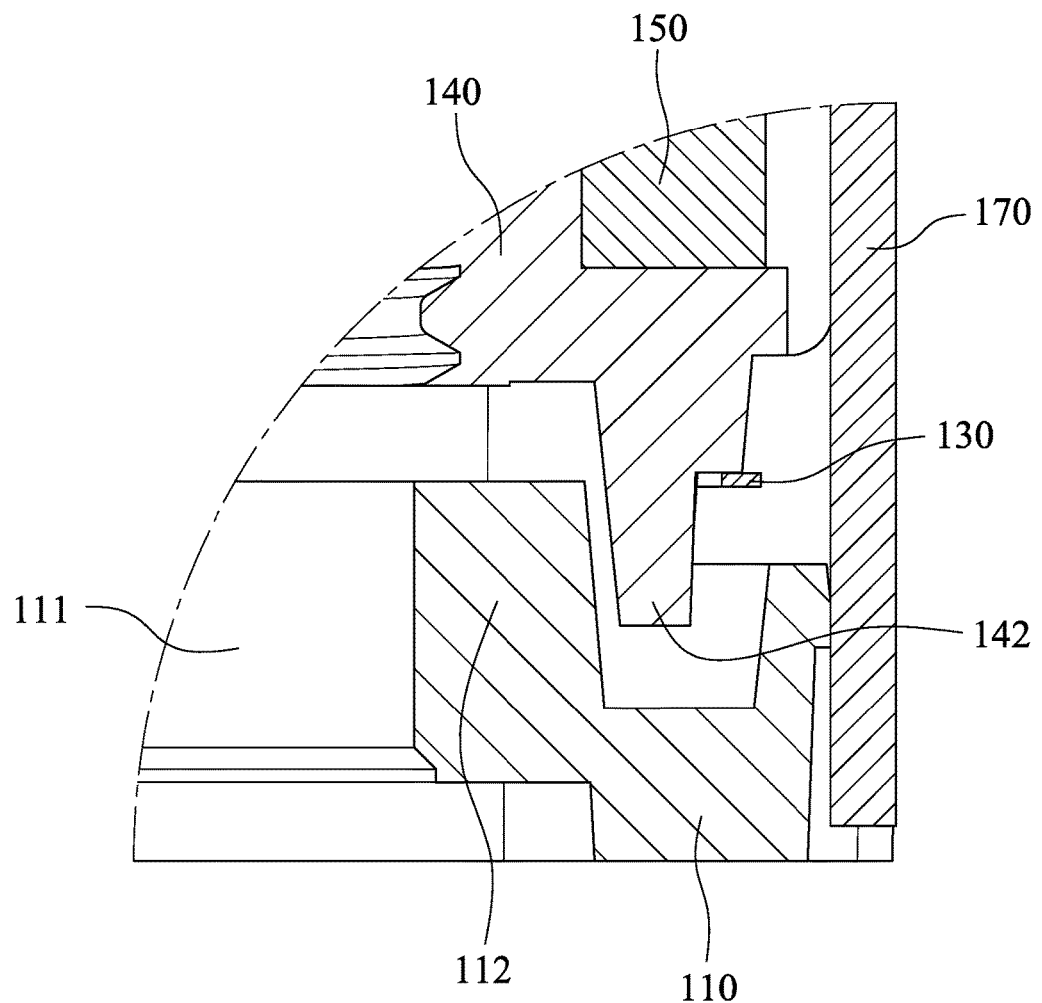
FIG. 4 is a cross-sectional view along line 4-4 of FIG. 3.
Figure 5:
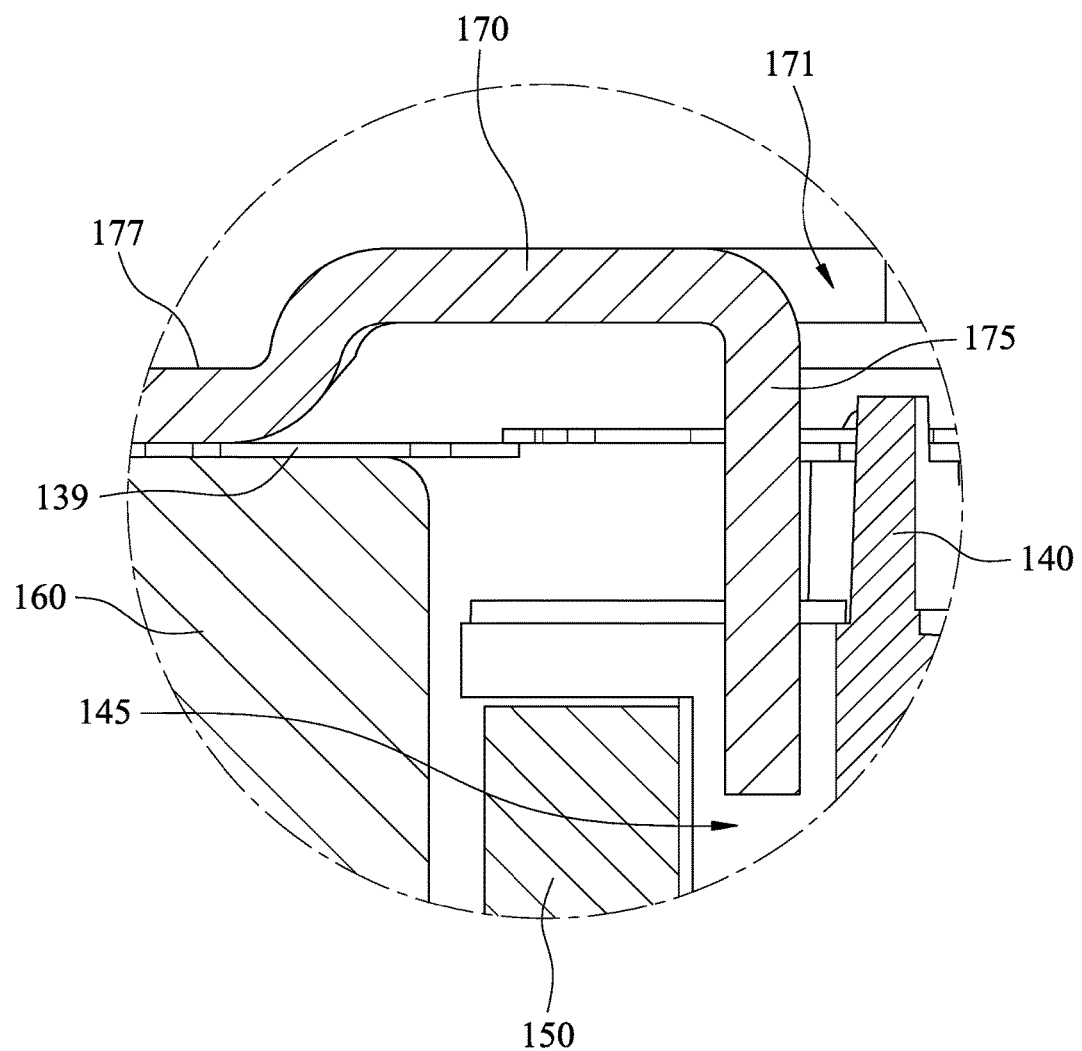
FIG. 5 is a cross-sectional view along line 5-5 of FIG. 3.

FIG. 4 is a cross-sectional view along line 4-4 of FIG. 3, and FIG. 5 is a cross-sectional view along line 5-5 of FIG. 3. In FIG. 1, FIG. 4 and FIG. 5, the metal yoke 170 is coupled to the holder 110, the carrier 140 is movably disposed in the metal yoke 170, the magnets 160 are disposed in the metal yoke 170, the coil 150 is wound around the carrier 140 and adjacent to the magnets 160, and the first spring plate 130 and the second spring plate 139 are coupled to the carrier 140 respectively.

In FIG. 1, the holder 110 includes a first opening 111 and a cylindrical sidewall 112, wherein the cylindrical sidewall 112 is disposed around the first opening 111.

The metal yoke 170 coupled to the holder 110 includes a second opening 171 and a front end portion 176. The cylindrical sidewall 112 extends from the first opening 111 towards the second opening 171. The second opening 171 is disposed on the front end portion 176, wherein the front end portion 176 includes a plurality of stepped surfaces 177.

In FIG. 2, when the lens assembly 200 is assembled to the voice coil motor 100, an image surface (not shown herein) is disposed near one side of the first opening 111 far from the second opening 171.

In FIG. 1 and FIG. 4, the carrier 140 movably disposed in the metal yoke 170 includes a covering portion 142. The covering portion 142 is disposed on one side of the carrier 140 towards the holder 110 and correspondingly to the cylindrical sidewall 112, wherein the covering portion 142 surrounds the cylindrical sidewall 112 and farther from the first opening 111 than the cylindrical sidewall 112. That is, a radial distance between the covering portion 142 and a central axis z is greater than a radial distance between the cylindrical sidewall 112 and the central axis z. Therefore, a dust-proof function not only can be provided by the covering portion 142 of the carrier 140 but also can be provided by the cylindrical sidewall 112 of the holder 110 so as to achieve double dust-proof functions, and a superior dust-proof function can further be achieved by the covering portion 142 and the cylindrical sidewall 112. It is favorable for reducing dust falling on the image surface through the second opening 171 of the metal yoke 170 and the first opening 111 of the holder 110 during the assembling process, so that the image quality can be enhanced and the requirements of high-end lens assemblies in electronic devices can be satisfied.

Figure 6:
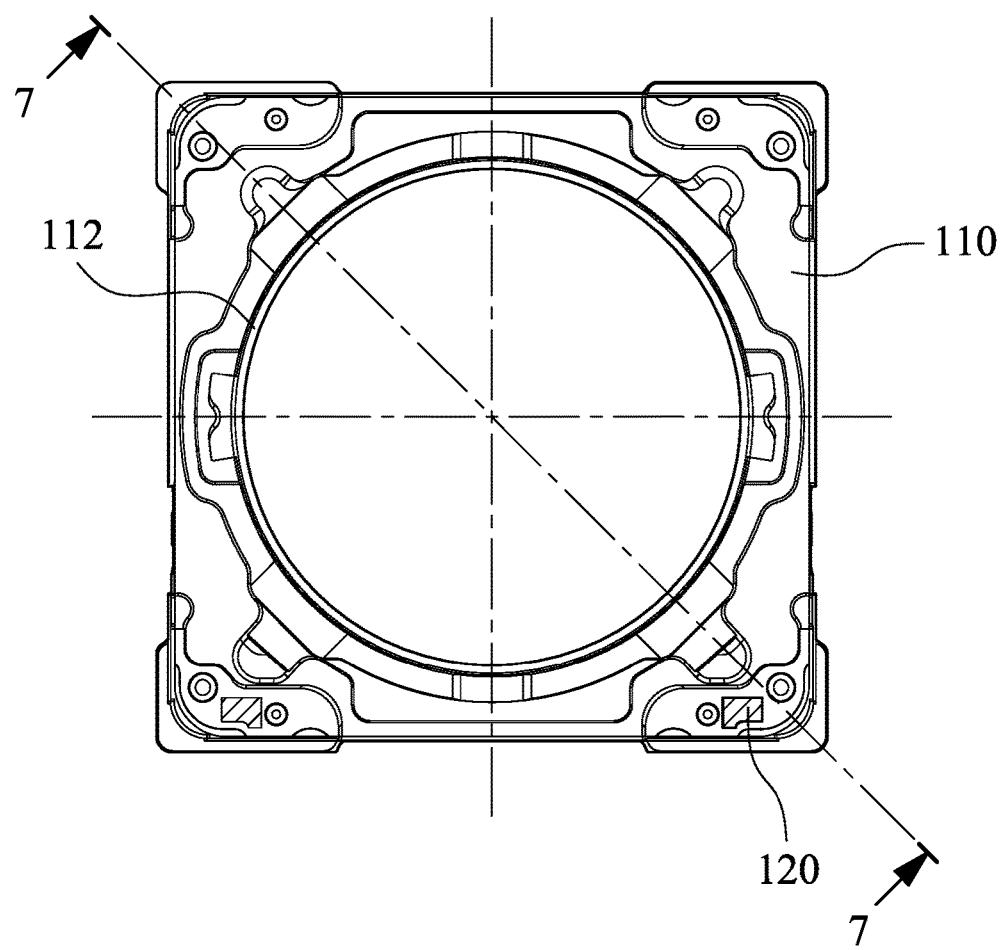
FIG. 6 is a top view of a holder according to the embodiment of FIG. 1.
Figure 7:
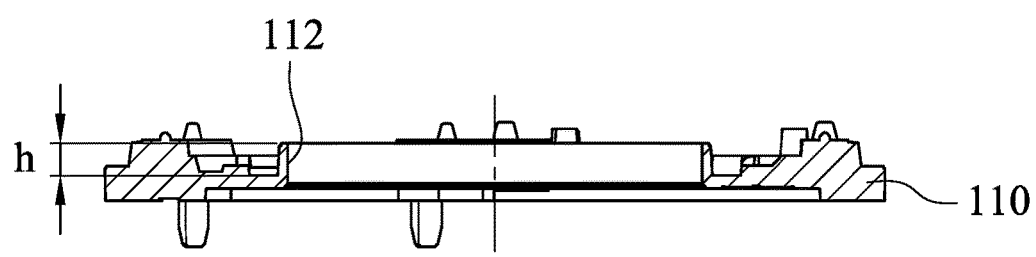
FIG. 7 is a cross-sectional view along line 7-7 of FIG. 6.

FIG. 6 is a top view of the holder 110 according to the embodiment of FIG. 1, and FIG. 7 is a cross-sectional view along line 7-7 of FIG. 6. In FIG. 6 and FIG. 7, when a height of the cylindrical sidewall 112 parallel to the central axis z is h, the following condition is satisfied: 0.20 mm<h<0.85 mm. Therefore, it is favorable for maintaining the compact size of the voice coil motor 100 and further enhancing the dust-proof function achieved by the cylindrical sidewall 112 so as to effectively reduce dust falling on the image surface through the second opening 171 of the metal yoke 170 and the first opening 111 of the holder 110. According to the embodiment of FIG. 7, the following condition is satisfied: h=0.49 mm, but not limited thereto.

In FIG. 1, the magnets 160 are disposed in the metal yoke 170, wherein each of the stepped surfaces 177 of the metal yoke 170 is disposed correspondingly to each of the magnets 160 for adjusting a relative position parallel to the central axis z between the magnets 160 and the second opening 171 of the metal yoke 170. It is favorable for providing a proper relative position parallel to the central axis z between the magnets 160 and the second opening 171 so as to obtain a sufficient movable range of the coil 150 in the voice coil motor 100 with the compact size. According to the embodiment of FIG. 1 and FIG. 4, a number of the magnets 160 and a number of the stepped surfaces 177 are the same and both equal to four, but not limited thereto.

Both of the first spring plate 130 and the second spring plate 139 are coupled to the carrier 140 and flat sheets. That is, both of the first spring plate 130 and the second spring plate 139 include neither folded projections parallel to the central axis z nor structures connecting to each other. Therefore, it is favorable for saving the processing time and cost of the first spring plate 130 and the second spring plate 139.

In details, in FIG. 1 and FIG. 6, the voice coil motor 100 can further include at least two metal terminals 120 embedded to the holder 110 and electrically connected to the first spring plate 130. The first spring plate 130 is nearer the holder 110 than the second spring plate 139. The first spring plate 130 includes two portions electrically connected to the two metal terminals 120 respectively, wherein the two portions of the first spring plate 130 do not electrically conduct to each other. Therefore, it is favorable for enhancing the manufacturing efficiency and reducing the assembling steps of the voice coil motor 100. According to the embodiment of FIG. 1 and FIG. 6, a number of the metal terminals 120 is two, but not limited thereto.

Furthermore, the metal terminals 120 can be embedded in the holder 110 and made of an insert molding. Therefore, it is favorable for mass production.

In FIG. 1 and FIG. 5, each of the magnets 160 can be trapezoidal cylinder. That is, the two surfaces orthogonal to the central axis z (the normal line of each of the two surfaces is parallel to the central axis z) of each of the magnets 160 are both trapezoid. Each of the magnets 160 can be disposed at each of inner corners of the metal yoke 170 and around the coil 150. Therefore, it is favorable for magnetic polarization of the voice coil motor 100 during the assembling process, easily designing the tools corresponding to the magnets 160 as trapezoidal cylinders, and dispensing to assemble the magnets 160 and the metal yoke 170. According to the embodiment of FIG. 1 and FIG. 5, each of the magnets 160 is disposed at each of four inner corners of the metal yoke 170 and around the coil 150, but not limited thereto.

In FIG. 1, the coil 150 can be polygon. Preferably, the coil 150 can be octagon. Therefore, it is favorable for increasing the uniformity of the magnetic flux of the coil 150 corresponding to the magnets 160. According to the embodiment of FIG. 1, the coil 150 is octagon, but not limited thereto.

According to the embodiment of FIG. 1, the first spring plate 130 and the second spring plate 139 are both coupled to the carrier 140. Therefore, when the lens assembly 200 is carried to move by the carrier 140, the first spring plate 130 and the second spring plate 139 are deformed by force to provide moving freedom and restoring force for the carrier 140 so as to achieve the auto-focusing function of the lens assembly 200.

Figure 8:
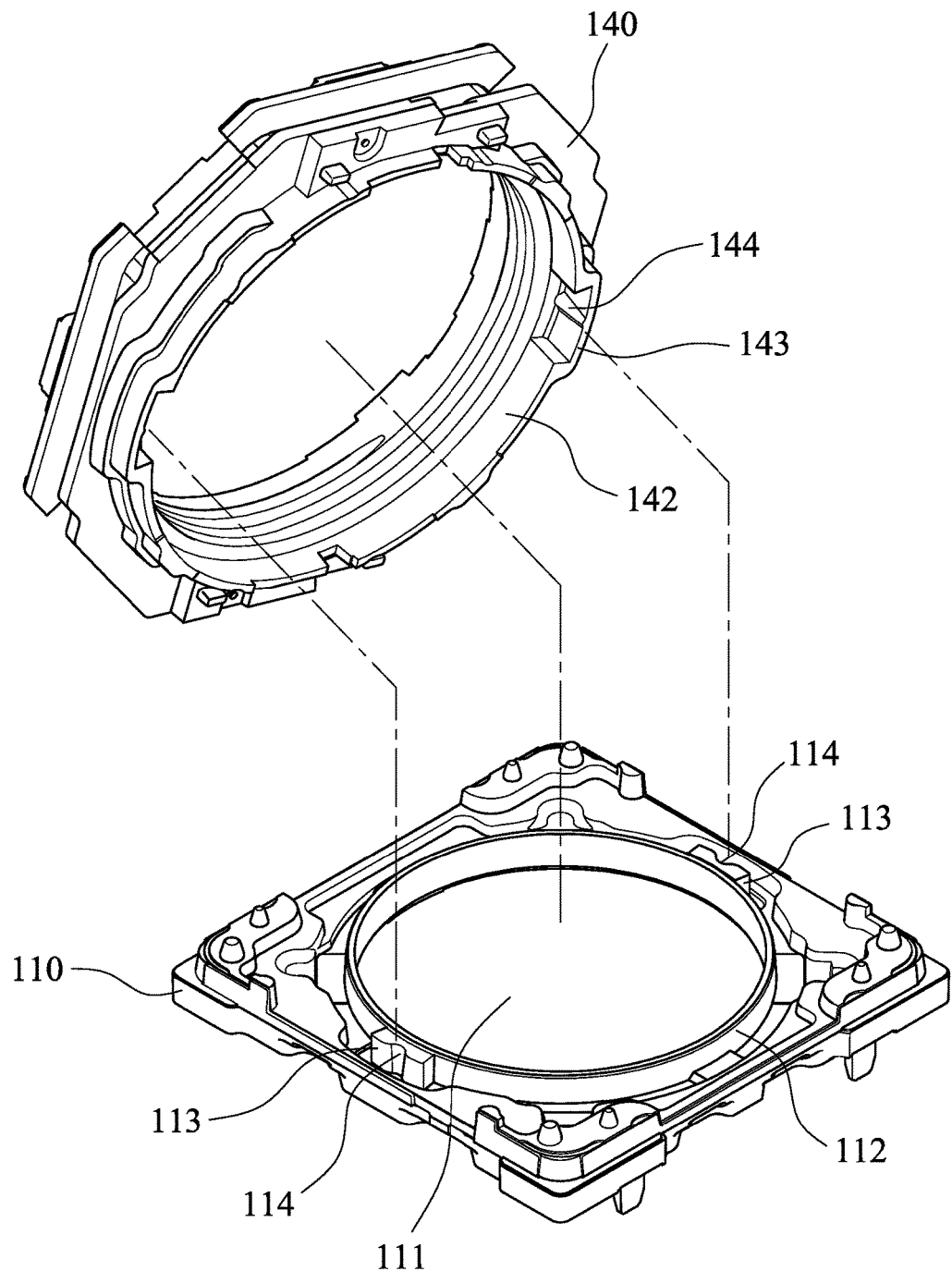
FIG. 8 is a schematic view of the holder and a carrier according to the embodiment of FIG. 1.

FIG. 8 is a schematic view of the holder 110 and the carrier 140 according to the embodiment of FIG. 1. In FIG. 1 and FIG. 8, the holder 110 can further include at least two radial protrusions 113. The radial protrusions 113 and the cylindrical sidewall 112 are formed integrally. The radial protrusions 113 protrude from the cylindrical sidewall 112. That is, the radial protrusions 113 are farther from the first opening 111 than the cylindrical sidewall 112. Therefore, it is favorable for reducing the structural complexity of the voice coil motor 100.

The carrier 140 can further include at least two radial enlarged portions 143 disposed on the covering portion 142, wherein each of the radial enlarged portions 143 is disposed correspondingly to each of the radial protrusions 113, so that the first spring plate 130 can be coupled to and positioned on the carrier 140. Therefore, it is favorable for obtaining an anti-torsion function by the radial enlarged portions 143 and the radial protrusions 113 so as to maintain flatness and prevent permanent distortion and deformation of the first spring plate 130 during assembling the voice coil motor 100 and the lens assembly 200. According to the embodiment of FIG. 1 and FIG. 8, a number of the radial protrusions 113 and a number of the radial enlarged portions 143 are both two, but not limited thereto.

Furthermore, each of the radial enlarged portions 143 can include a reverse structure 144. The reverse structure 144 protrudes from the radial enlarged portion 143 towards the central axis z and tapers from the second opening 171 towards the first opening 111. Moreover, each of the radial protrusions 113 can include a recessed structure 114, the recessed structure 114 is disposed correspondingly and embedded to the reverse structure 144 of each of the radial enlarged portions 143. Therefore, it is favorable for enhancing the anti-torsion function by the radial enlarged portions 143 and the radial protrusions 113 so as to maintain flatness and prevent permanent distortion and deformation of the first spring plate 130 during assembling the voice coil motor 100 and the lens assembly 200.

In FIG. 1 and FIG. 5, the metal yoke 170 can further include a plurality of inner walls 175. The inner walls 175 are connected to the second opening 171 and disposed towards the first opening 111 of the holder 110. The carrier 140 can further include a plurality of notches 145, wherein the notches 145 are located on one side of the carrier 140 towards the second opening 171, and each of the notches 145 is disposed correspondingly to each of the inner walls 175, so that the second spring plate 139 can be coupled to and positioned on the carrier 140. Therefore, it is favorable for obtaining another anti-torsion function by the notches 145 and the inner walls 175 so as to maintain flatness and prevent permanent distortion and deformation of the second spring plate 139 during assembling the voice coil motor 100 and the lens assembly 200. According to the embodiment of FIG. 1 and FIG. 5, a number of the inner walls 175 and a number of the notches 145 are both four, wherein each of the notches 145 is located correspondingly to each of the inner walls 175 disposed at each of four inner corners of the metal yoke 170, but not limited thereto.

According to the embodiment of FIG. 1, each of the radial enlarged portions 143 is disposed correspondingly to each of the radial protrusions 113, and each of the notches 145 is disposed correspondingly to each of the inner walls 175. When the lens assembly 200 is carried to move by the carrier 140, each of the radial enlarged portions 143 is disposed correspondingly to each of the radial protrusions 113, so that the first spring plate 130 can be coupled to and positioned on the carrier 140, and each of the notches 145 is disposed correspondingly to each of the inner walls 175, so that the second spring plate 139 can be coupled to and positioned on the carrier 140. Hence, the carrier 140 is carried to move by the first spring plate 130 and the second spring plate 139, so that the lens assembly 200 can be telescopically focused and double anti-torsion function can be achieved. It is favorable for maintaining flatness and preventing permanent distortion and deformation of the first spring plate 130 and the second spring plate 139 during assembling the voice coil motor 100 and the lens assembly 200.

Furthermore, in FIG. 1, the first spring plate 130 can be nearer the first opening 111 than the second spring plate 139. The first spring plate 130 can include at least two radial matching portions 133. A number of the radial matching portions 133 and the number of the radial enlarged portions 143 can be the same, and each of the radial matching portions 133 is coupled to each of the radial enlarged portions 143. Therefore, it is favorable for enhancing the assembling firmness between the first spring plate 130 and the carrier 140. According to the embodiment of FIG. 1, the number of the radial matching portions 133 is two, but not limited thereto.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A voice coil motor, comprising:
    a holder, comprising:
        a first opening;
        a cylindrical sidewall disposed around the first opening; and
        at least two radial protrusions, wherein the radial protrusions and the cylindrical sidewall are formed integrally, and the radial protrusions protrude from the cylindrical sidewalk;
    a metal yoke coupled to the holder and comprising:
        a second opening, wherein the cylindrical sidewall extends from the first opening towards the second opening; and
        a front end portion, wherein the second opening is disposed on the front end portion, and the front end portion comprises a plurality of stepped surfaces;
    a carrier movably disposed in the metal yoke and comprising:
        a covering portion disposed on one side of the carrier towards the holder and correspondingly to the cylindrical sidewall, wherein the covering portion surrounds the cylindrical sidewall and farther from the first opening than the cylindrical sidewall;
    a plurality of magnets disposed in the metal yoke, wherein each of the stepped surfaces is disposed correspondingly to each of the magnets for adjusting a relative position parallel to a central axis between the magnets and the second opening;
    a coil wound around the carrier and adjacent to the magnets; and
    at least two spring plates, wherein each of the spring plates is flat sheet and coupled to the carrier.

2. The voice coil motor of claim 1, further comprising:
    at least two metal terminals embedded in the holder and electrically connected to at least one of the spring plates.

3. The voice coil motor of claim 2, wherein each of the magnets is trapezoidal cylinder and disposed at each of inner corners of the metal yoke and around the coil.

4. The voice coil motor of claim 2, wherein the metal terminals are embedded in the holder and made of an insert molding.

5. The voice coil motor of claim 2, wherein the coil is polygon.

6. The voice coil motor of claim 5, wherein the coil is octagon.

7. The voice coil motor of claim 2, wherein the metal yoke further comprises:
    a plurality of inner walls connected to the second opening and disposed towards the first opening of the holder.

8. The voice coil motor of claim 1, wherein the radial protrusions are symmetrically disposed around the first opening.

9. The voice coil motor of claim 1, wherein the carrier further comprises:
    at least two radial enlarged portions disposed on the covering portion, wherein each of the radial enlarged portions is disposed correspondingly to each of the radial protrusions.

10. The voice coil motor of claim 9, wherein each of the radial enlarged portions comprises a reverse structure, and the reverse structure protrudes from the radial enlarged portion towards the central axis and tapers from the second opening towards the first opening.

11. The voice coil motor of claim 9, wherein the spring plates are a first spring plate and a second spring plate respectively, the first spring plate is nearer the first opening than the second spring plate, the first spring plate comprises at least two radial matching portions, and each of the radial matching portions is coupled to each of the radial enlarged portions.

12. The voice coil motor of claim 10, wherein each of the radial protrusions comprises a recessed structure, and the recessed structure is disposed correspondingly to the reverse structure of each of the radial enlarged portions.

\* \* \* \* \*